United States Patent Office 2,958,443
Patented Nov. 1, 1960

2,958,443

MOLDED CARRIERS

John L. Hutchinson, Wheaton, Ill., assignor to The Richardson Company, Melrose Park, Ill., a corporation of Ohio No Drawing. Filed June 15, 1959, Ser. No. 820,118

10 Claims. (Cl. 220—102)

This invention is concerned with carriers molded from polyolefins and, particularly, to carriers which are adapted to hold bottled beverages.

Various proposals have been suggested for making carriers from numerous plastic materials by a molding process. Among the plastic materials suggested are synthetic resins, either thermoplastic or thermosetting, and elastomeric materials, with or without fillers. Exemplary carriers and techniques for making the same are disclosed in the patents to Gerber 2,535,493; Ruschman 2,781,147 and Berman 2,884,977.

As indicated in the disclosure of these patents, it is frequently desirable to incorporate into the plastic material a fibrous filler in order to reinforce the molded carrier and generally improve its physical properties, particularly impact resistance. Certain polyolefins which have become available, such as linear high density polyethylene (density 0.960-0.940) and polypropylene, are known to have superior physical properties, for example, impact resistance, to the extent that various articles may be molded directly from these materials without requiring additional reinforcement, as is provided by the aforementioned fibrous fillers.

However, while the aforementioned polyolefins have improved physical properties as compared to many other commercially available plastics, they also have certain characteristics which are somewhat disadvantageous, particularly when used to form carriers adapted to hold bottled beverages.

One disadvantage of polyethylene and polypropylene, for example, results from the fact that carriers molded from such materials have little, if any, noise-deadening qualities, as is characteristic of many other molding compositions, such as, for example, rubber base molding compositions. Thus, when carriers made from polyethylene or polypropylene are used in a bottling plant, the jarring and impact of bottles against carriers and carriers against carriers is such that the noise level is noticeably higher as compared to carriers made from many other plastic materials.

Another disadvantage of using polyolefins in molding carriers is that such carriers have exceedingly smooth surfaces and, accordingly, have little, if any, frictional resistance with respect to a supporting surface, whereby the carriers have a marked tendency for movement even under slight force. This disadvantage is particularly troublesome when loaded carriers are stacked for transportation in that the carriers of the stack will readily move with respect to each other unless special guards, etc. are provided.

Accordingly, it is one object of this invention to provide carriers molded from polyolefins which have reduced tendency to create noise or sound upon impact with each other or other objects.

Another object is to provide a carrier of the above type having increased frictional resistance to movement.

These and other objects will become more apparent from the following detailed specification.

As indicated hereinabove, the polyolefins normally have such excellent physical properties that fibrous fillers are not required for purposes of reinforcement or otherwise improving general physical properties. However, to accomplish the objects of the present invention, fibrous fillers are incorporated with the polyolefins to form a composite moldable composition. The fibrous fillers are added within the range of fifteen to fifty percent based on the total weight of filler and polyolefin, with a preferred range being between about twenty-five and forty percent.

In order to achieve the desired objects, it is necessary that at least the aforementioned minimum amount of fibrous filler be used to insure sufficient fiber concentration in all parts of the carrier and, particularly, in those parts of the carrier which are inclined to receive the majority of impacts. The higher the fiber concentration, the more improvement is obtained in reduction of noise upon impact and also deformation of surfaces for purposes of increasing frictional resistance. However, the higher concentrations of filler also create molding problems which may offset advantages gained.

It is difficult to adequately incorporate quantities of fibrous filler much above fifty percent and still retain a moldable composition. If a composition is formed containing about sixty percent fibrous filler, it will be found that the composition will have poor flow and corresponding difficulties will be encountered in molding. Maximum advantages of including fibrous filler balanced against moldability of the composition are to be expected within the preferred range of twenty-five to forty percent fibrous filler.

Due to the fact that the polyolefins have little natural affinity for other materials, including fibrous fillers, special effort must be employed to obtain adequate dispersion of fibers in the plastic. Apparatus, such as a Banbury or extruders of the type sold by Welding Engineers and having reversed flights on the screws, may be used to soften and fuse the polyolefins and disperse the fibers.

A desirable filler, due to its availability and low cost, is cotton linters. However, when cellulosic fillers are used, special precautions are required to prevent charring and degradation of such fillers under the temperatures required to melt or fuse the polyolefins to a state wherein they can be forced through mold passages.

In addition to cotton linters, other fibrous fillers that may be used are sisal, sawdust, exploded wood fibers, asbestos, glass and synthetic fibers which will not fuse under the temperature required to render polyolefins moldable and which, of course, have the ability to reduce the noise characteristics of the polyolefins. Certain of the inorganic fibrous fillers are to be preferred, such as the aforementioned asbestos and glass fibers where temperatures required to fuse the polyolefins are relatively high.

In order to insure adequate moldability of the fiber-polyolefin composition, it is desirable that the maximum fiber length of the filler be about one and one-half inches. Preferably, the fibers should have an average length of between one-fourth of an inch and one inch.

Compositions of the foregoing type may be used to form various types of carriers, but particularly the one-piece compartmental carriers disclosed in the aforementioned patents wherein the carriers comprise a bottom, side and end walls and usually a plurality of integral partitions forming separate compartments. By reason of the initial blending and the subsequent molding operation, the fibers are dispersed throughout the molding composition whereby all parts of the molded carrier have the fibers in substantially the same concentration. Thus, all parts of the carrier are noise-deadened to about the same extent. Correspondingly, the extreme smoothness of the surfaces of the carriers resulting from using pure polyolefins will be reduced, particularly where the higher concentrations of fibers and lower molding temperatures are used as disclosed hereinbelow.

While the polyolefins constitute the principal binder of the present composition and the fibrous filler, the principal added component, it will be understood that other components may be added when desired, such as particulate fillers, coloring matter and the like.

Polyolefins may be readily molded by any of the various molding techniques currently in use, such as injection and compression molding. To achieve proper flow when injection molding polyolefins, it is frequently necessary to employ temperatures of the order of 400–450° F. Under temperatures of this level, polyolefins, such as polyethylene, are quite fluid. However, in forming carriers as contemplated herein, it is preferable to use a molding process wherein the temperature of the polyolefins does not exceed about 350° F. Temperatures at this level provide sufficient heat to fuse the polyolefin, but not to the extent where the polyolefin is in a substantially fluid state. Thus, the lower temperatures will not prevent molding of the filler-polyolefin combination, but will prevent the extreme diffusion of the polyolefin throughout the mass, whereby there will be less tendency for creation of a smooth surface "skin." This particular temperature level is more suitable for compression molding than for injection molding due to the fact that the lower flow characteristics are not as important in such a process as is the case with injection molding processes.

Having described the invention, the same is only intended to be limited by the scope of the following claims.

I claim:

1. An integral, one-piece molded carrier having partitions extending between the walls thereof forming a plurality of compartments molded from a composition comprising a fibrous filler and a polyolefin selected from the class consisting of polyethylene and polypropylene, said filler having a maximum fiber length of about one and one-half inches and comprising between fifteen and fifty percent by weight of the total weight of said composition.

2. A carrier as described in claim 1 wherein the polyolefin is polyethylene having a density of 0.94–0.96.

3. A carrier as described in claim 2 wherein the fibrous filler is cotton linters.

4. A carrier as described in claim 2 wherein the fibrous filler is asbestos fibers.

5. An integral, one-piece molded carrier having partitions extending between the walls thereof forming a plurality of compartments molded from a composition comprising a fibrous filler and a polyolefin selected from the class consisting of polyethylene and polypropylene, said filler having a maximum fiber length of one and one-half inches, and comprising between twenty-five and forty percent by weight of the total weight of said composition.

6. A carrier as described in claim 5 wherein the filler has an average length of between one-fourth and one inch.

7. A carrier as described in claim 6 wherein the polyolefin is polyethylene having a density of 0.94–0.96.

8. A carrier as described in claim 7 wherein the fibrous filler is cotton linters.

9. A carrier as described in claim 7 wherein the fibrous filler is asbestos.

10. In a process for making a one-piece compartmented carrier, the step of subjecting a composition comprising a polyolefin and between fifteen and fifty percent of a fibrous filler to a molding operation wherein the temperature of the composition does not exceed about 350° F.

References Cited in the file of this patent

UNITED STATES PATENTS

| | | |
|---|---|---|
| 2,572,184 | Newton | Oct. 23, 1951 |
| 2,728,740 | Iler | Dec. 27, 1955 |
| 2,751,366 | Braendle | June 19, 1956 |

FOREIGN PATENTS

| | | |
|---|---|---|
| 513,267 | Belgium | Dec. 1, 1952 |
| 698,611 | Great Britain | Oct. 21, 1953 |